Patented May 27, 1947

2,421,185

UNITED STATES PATENT OFFICE 2,421,185

DUSTLESS SALT AND PROCESS

Rock L. Comstock, Weeks, La., assignor to Bay Chemical Company, Inc., New Orleans, La., a corporation of Louisiana No Drawing. Application August 19, 1943, Serial No. 499,283

9 Claims. (Cl. 99—143)

This invention relates to a dustless salt and process of preparing such material and more particularly to a process and product in which dust or fine particles are adhered to or cemented to the salt crystals so as to produce a salt substantially free from dust.

The invention is of particular utility in the production of a dustless, free flowing granular sodium chloride such as table salt. It has been found difficult or impossible as a practical matter to separate the fine particles or dust from such material since the handling of the salt incident to blowing or other separating operations for removing the dust invariably forms additional amounts of fine particles or dust. Thus, ordinary table salt usually contains from 1 to 2% of fines which will pass through a 60 mesh screen and these fines are objectionable in that they produce dust when the salt is agitated or poured. In accordance with the present invention it has been found possible to adhere the small particles to the larger salt crystals by the use of a small amount of water-soluble adhesive in a manner which does not interfere with the free flowing properties of the salt. Also, it is desirable to add to such salt a finely divided material, referred to in the art as a drier, to prevent caking of the salt as a result of exposure to humid atmospheres. Such driers also constitute dust unless they are firmly adhered to the salt crystals, examples of such driers being powdered magnesium carbonate or tricalcium phosphate or various mixtures of similar finely divided materials. It has been found that the employment of small amounts of water-soluble adhesives effectively adhere the finely divided particles to the salt crystals without destroying the effectiveness of the drier even though such adhesives may be somewhat hygroscopic.

It is therefore an object of the present invention to provide an improved granular salt product which is free flowing and substantially free from dust.

Another object of the invention is to provide an improved granular salt product containing a finely divided drier which product is free flowing and substantially free from dust.

Another object of the invention is to provide an improved salt product in granular form in which a small amount of a water-soluble adhesive is present in order to adhere finely divided materials to the salt crystals without causing caking or impairment of flow of the material.

Another object of the invention is to provide a process of producing a substantially dust free, free-flowing granular salt.

Another object of the invention is to provide a process of producing a substantially dust free granular product from a granular material containing dust in which a solution of an adhesive is employed to adhere fine particles to the granules of said material.

Another object of the invention is to provide a process of incorporating a small amount of an adhesive into a granular salt to adhere finely divided material contained therein to the salt crystals.

A further object of the invention is to provide a process of producing a salt substantially free from dust in which a small amount of a water solution of a water-soluble adhesive is employed to adhere fine particles to the salt crystals.

A still further object of the invention is to provide a process of producing a substantially dustfree, non-caking salt in which a water-soluble adhesive is employed to coat the salt crystals and adhere thereto a finely divided drier.

The preferred adhesive employed in making a dust free salt product is dextrin applied in a water solution to the granular salt. Such solution will ordinarily be of approximately 20 to 25% concentration and may be incorporated in the salt and distributed over the surface of the salt particles by adding the solution to granular salt and thoroughly agitating the mixture. The amount of solution employed is small in proportion to the amount of salt. Thus the preferred amount of solution of the concentration given above ranges from approximately 0.05 to 0.2% of the weight of salt. On the basis of a 20% solution this provides an amount of dextrin ranging between approximately 0.01 to 0.04% dextrin in the final composition. The small amount of water in the solution does not appreciably damper the salt and the salt remains free flowing, but nevertheless the fine particles contained in the salt are effectively adhered to the salt crystals and remain adhered even though the salt is subsequently air dried. The presence of the small amount of dextrin does not appreciably increase the hygroscopic properties of the salt and the resulting product either before or after drying will remain non-caking or free flowing under substantially any conditions which will not cause caking of the original salt.

It has been found desirable to add a small amount of a finely divided drier to prevent salt from caking as a result of exposure to a relatively humid atmosphere. A preferred drying material is powdered magnesium carbonate and this material is preferably added in powdered form immediately after the adhesive solution has been thoroughly incorporated into the granular salt. A preferred amount of magnesium carbonate is approximately 0.7% on the basis of the final salt composition and by adding this material to the mass of salt after the adhesive solution has been thoroughly spread over the surface of the salt crystals, the fine particles of magnesium carbonate are adhered to the salt crystals. A substantially uniform incorporation of the magnesium carbonate into the salt is accomplished by thoroughly agitating the mixture to distribute the particles of magnesium carbonate throughout the mass of salt. The resulting salt may be packaged immediately without drying and remains substantially dust free and free flowing even upon being subjected to relatively moist atmospheres, but may be dried prior to packaging, if desired, without destroying the free flowing and dust free characteristics of the salt.

A preferred composition in accordance with the present invention is as follows:

|  | Percent By Weight | Lbs. per ton |
| --- | --- | --- |
| Granular Salt | 99.2375 | 1,984.75 |
| Dextrin | .0125 | 0.25 |
| Water | 0.05 | 1.0 |
| Magnesium Carbonate | 0.7 | 14.0 |

While dextrin is the preferred adhesive, since it has given best results, is a recognized edible product and may be obtained in substantially pure form so as to be white or substantially colorless, other water-soluble adhesives have also been found applicable. Thus, solutions or colloidal dispersions of other organic adhesives such as starch and common glue, either animal or vegetable glue, have been found applicable so far as producing a dust free salt is concerned. Further examples of adhesives which may be employed are gelatin or the water-soluble gums such as gum acacia or tragacanth. Thus nearly any water-soluble adhesive which will dry to an adherent film may be employed. If a colorless adhesive is employed, it does not affect the appearance of the salt but can usually be detected by the production of a gray color upon ignition of the salt.

The solution of the adhesive employed should have relatively low viscosity, i. e. should be free flowing, as too great a concentration of adhesive in the solution causes gumming and agglomeration of the salt rather than the even coating of the salt crystals. In general it is preferred to employ substantially as great an amount of adhesive in the water as will provide a non-viscous, free flowing solution in order to reduce as far as possible the amount of water necessary for a given amount of adhesive. It is apparent that the concentration of the solution employed as well as the amount of adhesive employed may vary with the particular adhesive employed as well as with the properties of the salt. However, with the adhesives thus far employed, 20 to 25% solutions have been found to give best results. For example, with dextrin a 33% solution has been found too stiff and viscous while the solutions much below 15% the amount of water employed to incorporate the adhesive into the salt is excessive and these figures appear to be approximately correct for other adhesives. Thus the extreme ranges of concentrations appear to extend between approximately 15 and 30%.

Also, with the water-soluble adhesives thus far employed the preferred range of adhesive on a dry basis appears to extend between approximately 0.01 to 0.05% of the final salt composition, the lower portion of this range giving best results. In some instances amounts as low as 0.005% give satisfactory results and the same is true of amounts of adhesives as great as 0.1%. The important considerations appear to be the employment of as concentrated a solution of adhesives as will produce a non-viscous, free flowing solution and the employment of as small an amount of this solution as will substantially uniformly coat the surfaces of the salt particles and adhere the finely divided material, such as fine salt or drier, to the salt crystals. Too great an amount of adhesive renders the particles sticky and causes caking of the salt.

Since the solution of water-soluble adhesive is thoroughly admixed with the salt containing the fine particles of salt, it will be apparent that both the larger salt crystals and the finer particles of salt are coated with the adhesive and the absence of dust in this product indicates that the small particles of salt constituting the dust are firmly adhered to the larger salt crystals. Subsequent addition of the drier, if used, also causes the fine particles of the drier to be adhered to the salt crystals although the particles of the drier are not necessarily completely coated with the adhesive solution.

The above discussed concentrations of adhesive solutions are with respect to operations in which the solution is added to the salt at ordinary room temperatures. It has, however, been found possible to coat the salt while it is still heated as a result of a previous drying treatment. This can be accomplished by diluting the adhesive solution so that evaporation of water therefrom due to mixing the material with the heated salt leaves a coating on the salt particles in which the ratio of adhesive to water is approximately that discussed above when the drier is added. The amount of dilution will vary with the temperature of the salt so that no precise amounts can be given. The amount of water in the coating on the salt crystals will therefore preferably range between approximately 0.03 to 0.2% on the basis of salt composition when the drier is incorporated thereinto, but may range from approximately 0.01 to approximately 0.6%.

While the preferred drier is magnesium carbonate in amounts equal to approximately 0.7% of the composition, other materials such as those mentioned above may be employed without departing from the invention and the amount of drier may also be varied depending upon the type employed. For example, the purity of the salt employed in the composition, in some cases, has an effect upon the amount of drier required so that the amount of drier may vary from an amount considerably less than that given up to several percent of the salt composition. The amount of drier employed has no substantial effect upon the results of the present invention except that with large amounts of drier it may be desirable to use amounts of adhesive in the upper portion of the range given above.

After incorporation of the drier the resulting product may be airdried without production of fines in the salt and if no drier is desired in the final product the salt after coating with the adhesives to cement the fines to the crystals, may likewise be dried to produce a dust free salt. As stated above, the incorporation of the small amount of water-soluble adhesives contemplated by the present invention does not measurably increase the hygroscopic properties of the salt even though the adhesive may itself be somewhat hygroscopic. That is to say, the salt remains free flowing under substantially the same conditions as salt not containing the adhesive.

Although the invention has been described particularly with reference to producing a substantially dustless, free flowing table salt, it is apparent that it is applicable to other water soluble crystalline granular solids such as salts having physical properties similar to those of sodium chloride. It will also be apparent that adhesives may be used without solvent and that solvents other than water may be effectively employed as a vehicle for the adhesive and that the invention will serve to make dust free such granular materials as coal, coke, etc. While I have disclosed the preferred embodiments of my invention it is understood that the details thereof may be varied within the scope of the following claims.

I claim:

1. The process of producing a free-flowing substantially dustless granular salt from a free-flowing granular water-soluble salt containing fine material in the form of dust, which comprises, applying to the particles of said salt an aqueous solution of a water-soluble adhesive which will dry to an adherent film, said solution having a concentration between approximately 15% to 30% adhesive, the amount of said solution providing between approximately 0.005 and 0.1% of said adhesive by weight on a dry basis on said salt.

2. The process defined in claim 1, in which the granular salt to which the adhesive is applied is hygroscopic.

3. The process of producing a free-flowing substantially dustless granular salt from a free-flowing granular water-soluble salt containing fine material in the form of dust, which comprises, applying to the particles of said salt an aqueous solution of dextrin having a concentration between approximately 15% and 30% dextrin, the amount of said solution providing between approximately 0.005 and 0.1% of said dextrin by weight on a dry basis on said salt.

4. The process defined in claim 3, in which a small amount of a powdered drier is incorporated into the salt after the solution of dextrin has been applied thereto.

5. The process of producing a free-flowing substantially dustless granular salt from a free-flowing granular sodium chloride containing fine material in the form of dust, which comprises, applying to the particles of said sodium chloride a solution of a water-soluble adhesive which will dry to an adhesive film, said solution having a concentration between approximately 15 and 30% adhesive and being applied in an amount providing between approximately 0.005 and 0.1% of said adhesive by weight on a dry basis on said salt.

6. The process defined in claim 5, in which the water-soluble adhesive is dextrin.

7. As a product of manufacture, a substantially dustless free-flowing granular water-soluble salt having the particles thereof coated with approximately 0.005 to 0.1% by weight on a dry basis of dextrin, said salt having the finer particles thereof adhered to larger particles by said dextrin.

8. The product defined in claim 7, in which a small amount of a powdered drier is present in the salt and the particles of said drier are also adhered to the larger particles of said salt by said adhesive.

9. As a product of manufacture, a substantially dustless granular sodium chloride having the particles thereof coated with approximately 0.005 to 0.1% by weight on a dry basis of dextrin, said sodium chloride having the finer particles thereof adhered to larger particles of said sodium chloride by said dextrin.

ROCK L. COMSTOCK.

REFERENCES CITED

The following references are of record in the file of this patent:

UNITED STATES PATENTS

| Number | Name | Date |
|---|---|---|
| 462,730 | Ongley | Nov. 10, 1891 |
| 536,260 | Bloede | Mar. 26, 1895 |
| 1,974,915 | Giesecke | Sept. 25, 1934 |
| 2,018,633 | Boller | Oct. 22, 1935 |
| 2,183,173 | Segura | Dec. 12, 1939 |
| 2,288,409 | Lippman et al. | June 30, 1942 |
| 2,299,288 | Whymper | Oct. 20, 1942 |